(12) United States Patent
Steinke et al.

(10) Patent No.: US 6,658,109 B1
(45) Date of Patent: Dec. 2, 2003

(54) METHOD AND APPARATUS FOR SUPPLYING POWER TO A TWISTED PAIR WIRE ON A TELECOMMUNICATIONS MODEM TRANSMISSION LINK

(75) Inventors: Paul D. Steinke, Elk Grove, IL (US); Joseph T. Charles, Inverness, IL (US); Jay T. Biondo, Bloomingdale, IL (US); Joan M. Cook, Palatine, IL (US); Scott M. Keane, Mt. Prospect, IL (US)

(73) Assignee: Charles Industries, Inc., Rolling Meadows, IL (US)

( * ) Notice: Subject to any disclaimer, the term of this patent is extended or adjusted under 35 U.S.C. 154(b) by 0 days.

(21) Appl. No.: 09/338,949

(22) Filed: Jun. 22, 1999

(51) Int. Cl.⁷ ................................................ H04M 9/08
(52) U.S. Cl. .............. 379/413; 379/413.01; 379/399.01
(58) Field of Search .................. 379/399.01, 399.02, 379/401, 412, 413, 413.01–413.02

(56) References Cited

U.S. PATENT DOCUMENTS

| 4,374,306 | A | * | 2/1983 | Lohr |
| 4,766,606 | A | * | 8/1988 | Bardutz et al. |
| 5,790,654 | A | * | 8/1998 | Eklof |
| 5,812,933 | A | * | 9/1998 | Niki |
| 6,208,670 | B1 | * | 3/2001 | Milliron et al. |
| 6,396,391 | B1 | * | 5/2002 | Binder |
| 6,445,791 | B1 | * | 9/2002 | Grisamore et al. |

* cited by examiner

*Primary Examiner*—Duc Nguyen
(74) *Attorney, Agent, or Firm*—Leydig, Voit & Mayer, Ltd.

(57) ABSTRACT

A circuit and supplemental power source connection scheme for a telecommunications modem transmission link are described. The supplemental power source is connectable at any point along a telecommunications wire, including the terminals of repeaters and remote terminals. The combiner circuit includes a diode bridge for ensuring the proper connection of externally connected high voltage power to internal circuitry of the power combiner. The combiner also includes a line polarity matching circuit that automatically configures to signally connect internal positive and negative voltage signals to corresponding positive and negative external signal lines on a telecommunications modem transmission link.

9 Claims, 4 Drawing Sheets

FIG. 4

| Polarity of Terminal 20a (power input) | Polarity of Line 42a | Polarity of Line 42b |
|---|---|---|
| Positive | Positive | Negative |
| Negative | Positive | Negative |

FIG. 5

| Polarity of Terminal 20a (power output) | P1 (70) state | P2 (72) state | N1 (86) state | N2 (88) state | Comment |
|---|---|---|---|---|---|
| High | Off | On | Off | On | 24a connects to positive voltage through P2; and 24b connects to negative voltage through N2. |
| Low | On | Off | On | Off | 24a connects to negative voltage through N1; and 24b connects to positive voltage through P1. |

METHOD AND APPARATUS FOR SUPPLYING POWER TO A TWISTED PAIR WIRE ON A TELECOMMUNICATIONS MODEM TRANSMISSION LINK

AREA OF THE INVENTION

The invention generally relates to the area of telephonic data transmission facilities. More particularly, the present invention concerns methods and apparatuses for ensuring that a signal transmitted on a twisted pair line will be received at a remote system with sufficient power.

BACKGROUND OF THE INVENTION

Telecommunications modem systems, of which pair gain systems are a specific example, experience electrical signal power loss between transmission and reception facilities which are typically several kilometers apart. Copper wire, the typical medium for signal transmission on such systems, is a very good conductor and signal losses over short distances are negligible. However, when used to transmit signals for several kilometers in a telecommunications modem system environment, the signal power loss during transmission on the copper wire is no longer negligible. As a consequence, the span, or total distance from source to receiver is limited.

Furthermore the transmitted signals often pass through one or more line-powered repeater nodes powered by the twisted pair line carrying the transmitted signals. The electronic circuitry within the repeater nodes consumes power and thus the power transmitted from the repeater nodes is less than the input power to the repeater nodes. If a transmission path includes a number of such repeaters, the power consumed becomes substantial and power must be added to the wire in order to achieve the desired span for the line-powered series of repeater nodes.

It is known to add power to the transmitted power from the signal pair signal at a repeater or other type of node. The added power originates from previously installed remote high voltage power sources. Phone companies install these power sources to provide power to existing equipment. The remote power supplies are typically already in existence. Power lines are extended from the existing remote high voltage power sources to repeater nodes where their power is added to the power from the signaling pair. Special circuitry must be included in the repeater nodes to facilitate attachment of the power supply lines from the remote power source to the repeater nodes.

The limitations on potential span present a significant problem to phone companies serving remotely located customers. The density of remote power sources is greatest in areas of high population density. In areas of high population density, remote high voltage power supplies are likely to be found at convenient locations so that power can be supplied at a repeater node. However, in sparsely populated areas, finding a conveniently located power supply is less likely.

Yet another potential problem is the added cost to enable adding the power boosting lines at a repeater node. Hardware capability would have to be provided for all repeaters unless the manufacturer was willing to support two distinct hardware configurations, one configuration that enabled and another that did not enable attaching the supplemental power lines at the repeater nodes. In this case, nodes would be swapped out if the customer decides to add a supplemental power line pair.

SUMMARY OF THE INVENTION

The present invention improves the quality and accuracy of data transmissions in order to overcome some, if not all, of the problems encountered when attempting to provide additional power to telecommunications modem system lines. A power combiner provides an interface between a remote high voltage power source and twisted pair lines connecting a transmitter and receiver in a telecommunications modem system. The combiner comprises a first interface to the high voltage power source. The first interface is communicatively coupled to a low pass filter interposed between the first interface and an attached telecommunications modem system twisted pair line. The low pass filter is constructed such that the data signal transmitted on the telecommunications modem system line does not pass to the first interface. A second interface connects the low pass filter to the telecommunications modem system twisted pair line.

In accordance with a more particular aspect of certain embodiments of the present invention, the first interface comprises a diode bridge. The diode bridge automatically configures the connections between the power supply lines and the combiner. The diode bridge ensures that regardless of which power supply input terminals of the combiner the positive and negative voltage lines are connected, the internal path of current through the combiner will be configured so that the power supply lines are properly connected to the positive and negative voltage inputs to the low pass filter. This circuit eliminates the possibility that a technician will incorrectly attach positive and negative input lines of the low-pass filter to a remote power source.

In accordance with another aspect of certain embodiments of the present invention, switching circuitry within the second interface automatically configures the line connections between the low pass filters and the telecommunications modem system twisted pair lines. As a result, the positive and negative voltage lines from low pass filter are properly connected to the telecommunications modem system regardless of how a technician connects the external terminals of the combiner to the telecommunications modem lines. Thus, the two self-configuring circuits enable a person to splice the combiner circuit into a telecommunications modem line with knowledge only of which terminals are connected to the power supply and which ones are connected to the telecommunications modem line. The person need not know the polarity of either the remote power twisted pair or the signaling twisted pair since the combiner apparatus will automatically configure its internal connections to establish the proper line polarities.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 4 is a table summarizing the steady-state operation of the power input stage of the circuit depicted in FIG. 3 for the two possible power input connection schemes to illustrate the automatic configuration capabilities of the power combiner circuit; and FIG. 5 is a table summarizing the steady-state operation of the polarity matching stage of the power combiner circuit.

DETAILED DESCRIPTION OF ILLUSTRATIVE EMBODIMENTS OF THE INVENTION

Figure 1:
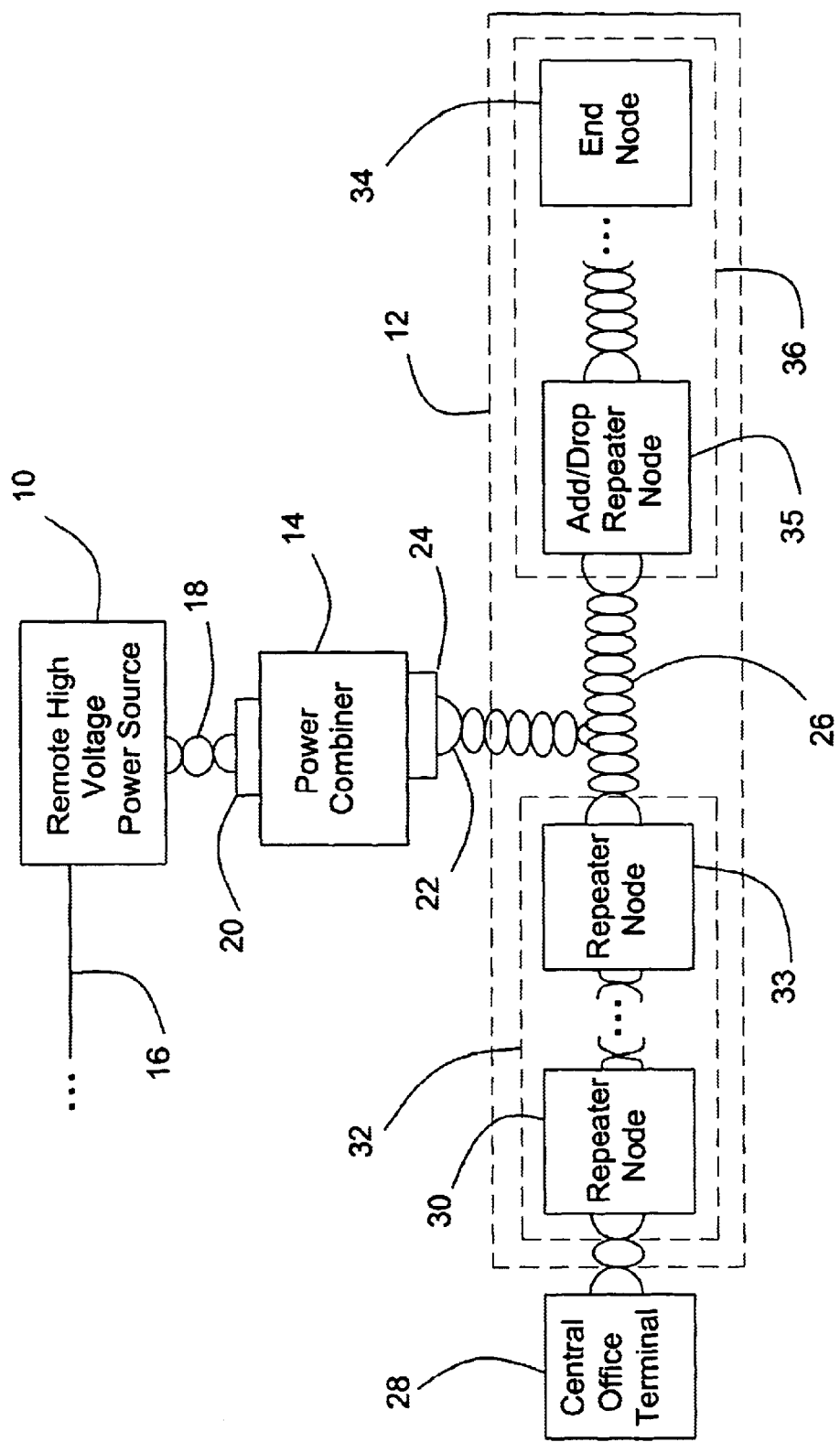
FIG. 1 is a high level schematic block diagram identifying the primary components of a connection between a remote high voltage power source and telecommunications modem system for delivering power to the telecommunications modem via a power combiner in accordance with an embodiment of the present invention.

Turning now to FIG. 1, a high-level block diagram schematically depicts primary components in a connection between a remote high voltage power source 10 and a line-powered telecommunications modem repeater system 12 via a power combiner 14. The remote high voltage power source 10 is one of numerous such power stations that currently exist at various locations throughout the regions covered by wire-based telephone service. The high voltage power sources provide electricity to previously existing phone company equipment. The modem repeater systems, such as the modem repeater system 12, are relatively new. As a consequence, the high voltage power sources are not always conveniently located for supplementing power to the later installed modem repeater systems. The capability of the power combiner to connect anywhere along several kilometers of a span of twisted pair wire between two modem repeater nodes provides design flexibility to the phone companies when upgrading their existing twisted pair phone networks to include modem repeater systems powered by remote high voltage power sources.

The remote high voltage power source 10 is connected to, and powered by high voltage lines 16 which often span a distance of over 100 kilometers. The remote high voltage power source 10 supplies high voltage power via twisted pair lines 18 to power input terminals 20 on the power combiner 14. The differential voltage on twisted pair lines 18 is, for example, 400 volts d.c. Another commonly used voltage is 260 volts d.c. There is no intention to limit the present invention to a particular voltage. The twisted pair lines 18 are, for example, up to 20 kilometers. However, the intended scope of the present invention is not limited by these particular examples. The input stage of the power combiner 14 embodying the present invention will operate in other environments where a differential voltage is applied to the input power terminals 20.

The power received on lines 18 passes through a low pass filter within the power combiner 14. The power is then transmitted via twisted pair lines 22 from output power terminals 24 to connected twisted pair modem repeater transmission lines 26. Power is thus added by the high voltage power source to the repeater nodes connected downstream from the transmission lines 26. In the illustrative embodiment, the twisted pair lines 22 connecting the power combiner 14 to the modem twisted pair lines 26 is less than 4 meters. However, other embodiments of the invention may use longer lines.

The telecommunications modem system depicted in the illustrative embodiment includes a central office terminal (COT) 28. The COT 28 transmits both the original digital modem signal as well as the d.c. power via twisted pair lines 30 to a first modem repeater node in a chain of repeater nodes 32. It is noted that the chain of repeater nodes 32 includes simple repeater nodes as well as add/drop units. The add/drop units include additional circuitry for interfacing to a phone service customer's internal lines and plain old telephones (POTS). By the time the power transmitted on lines 26 is received by the last node (an add/drop unit for connection to a customer's internal phone lines) in the chain of repeater nodes 32, sufficient power does not exist to power an end node 34 on a chain of nodes 36 powered via twisted pair lines 26. The power combiner 14 is therefore attached via lines 22 to the twisted pair lines 26 to supply additional power to the chain of repeater nodes 36. Lines 22 may be attached anywhere in the path between the output terminals of the last repeater node 33 of the chain of repeater nodes 32 and the input terminals of the first repeater node 35 of the chain of repeater nodes 36—including the terminals themselves.

Having described an illustrative embodiment of a system incorporating the present invention, it is noted that the distances listed in FIG. 1 are merely exemplary, and in no way is the invention intended to be limited by the distances between the illustratively depicted components.

Figure 2:
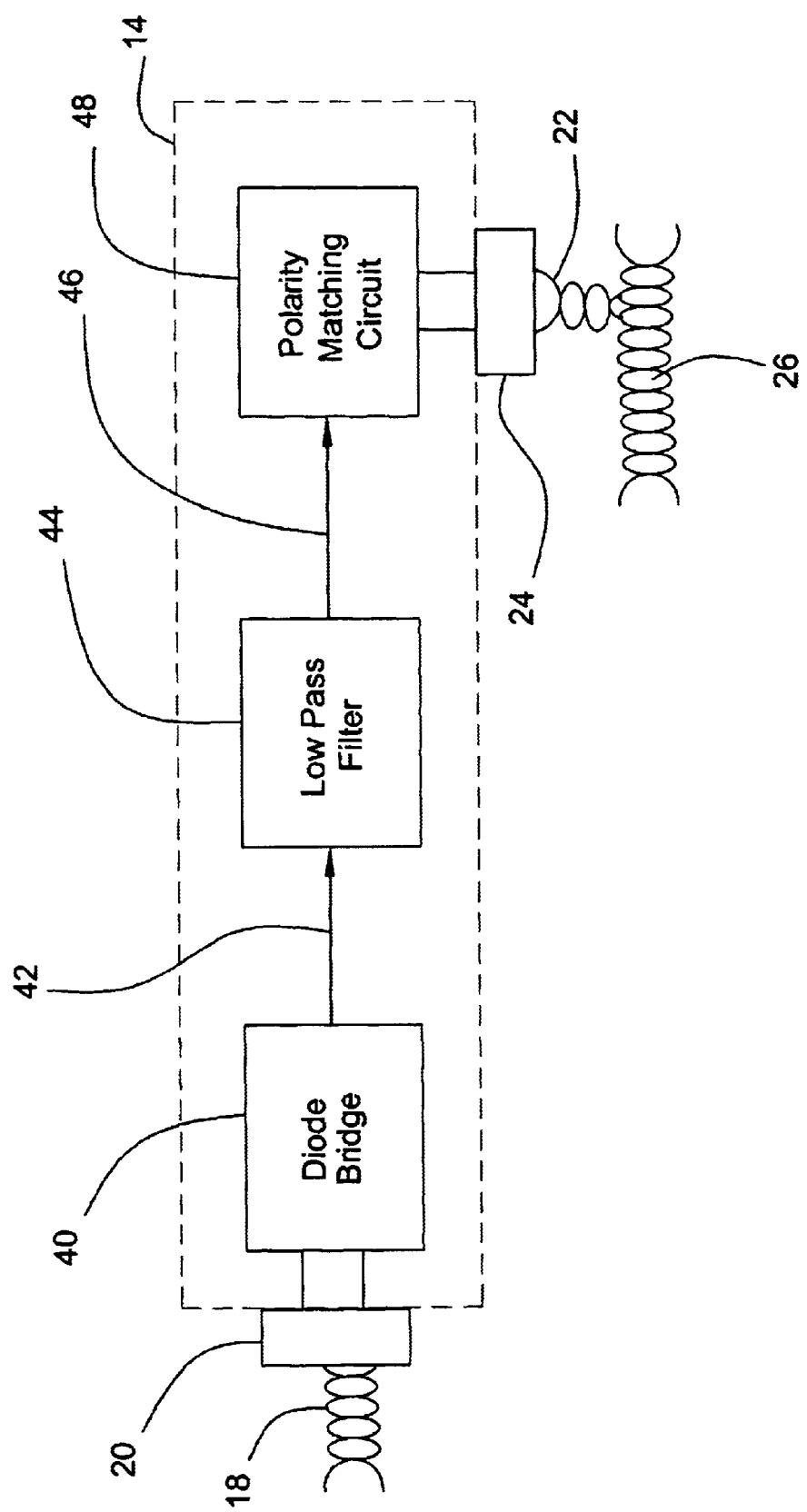
FIG. 2 is a medium level schematic diagram of the power combiner depicted in FIG. 1.

Turning now to FIG. 2, the power combiner 14 is broken down into its structural sub-components. A diode bridge 40 is connected to the external power input terminals 20 of the power combiner 14. The diode bridge 40 is an automatically configurable circuit that ensures that the signals on lines 42 to the low pass filter are properly polarized (positive and negative voltage). An exemplary circuit for performing this function is described herein below. However, those skilled in the art will readily appreciate that a number of different circuits are capable of performing this automatic line configuration feature of the power combiner 14.

Next, a low pass filter 44 receives a polarized power signal on lines 42 and passes the signal on lines 46 to a modem line polarity matching circuit 48. The low pass filter 44 rejects the high frequency modem signals (800 Kbps 2B1Q HDSL) transmitted between repeater nodes on twisted pair lines 26. Therefore from the perspective of the modem repeaters attached to twisted pair lines 26, the signal path via lines 22 ends as an open circuit at lines 46.

The polarity matching circuit 48 receives the polarized power signal on lines 46 and automatically creates signal paths from lines 46 to matching polarity lines 22. This ensures that no matter how lines 22 are connected to terminals 24, the polarity will be correct when the lines 22 are connected to twisted pair lines 26 by means of a well known bridge tap style connection point. An example of the polarity matching circuit 48 is illustratively depicted in FIG. 3 described herein below. However, those skilled in the art will readily appreciate that a number of different circuits are capable of performing this automatic polarity-matching feature of the power combiner 14.

Figure 3:
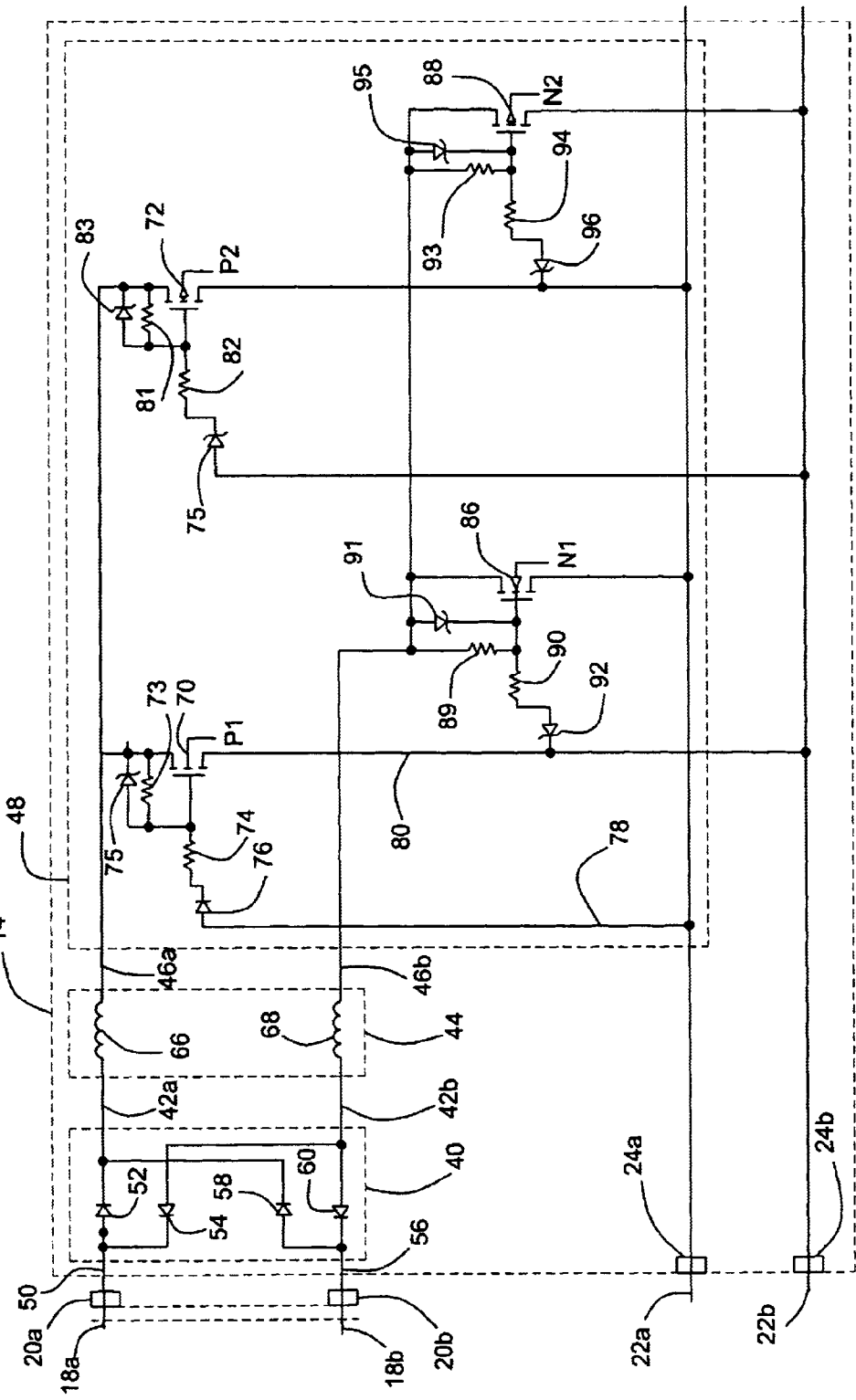
FIG. 3 is a low level schematic diagram of the power combiner depicted in FIG. 2.

Having described the power combiner 14 in terms of its high level components, attention is now directed to FIG. 3 wherein a circuit diagram is provided in accordance with an exemplary embodiment of the power combiner 14. Those skilled in the art will readily appreciate that the individual circuit components as well as the functional components of the circuit depicted in FIG. 3 can be readily replaced by known equivalent circuits and components and still obtain substantially the same result. For example, appropriately connected transistor circuits can replace the diodes, or the transistor polarity matching circuit 48 could be replaced by a series of mechanical relays. Further signal conditioning and protection circuitry may also be added. The sizing and/or type of components may be changed without substantially changing the operation or functions performed by the power combiner 14.

Turning now to the individual components of the power combiner circuit, external input line 18a connects to input terminal 20a. Line 50 carries the input power from terminal 20a to the anode of diode 52 or from the cathode of diode 54. External input line 18b connects to input terminal 20b.

Line 56 carries the input power from terminal 20b to the anode of diode 58 or from the cathode of diode 60. The cathodes of diodes 52 and 58 are connected to line 42a, the positive voltage input line to the low pass filter 44. The anodes of diodes 54 and 60 are connected to line 42b, the negative voltage input line to the low pass filter 44.

In general, the diodes 52, 54, 58 and 60 are selected such that their reverse breakdown voltages will not be exceeded when the combiner is attached to a modem repeater line in a pair gain system. Therefore, in the presently preferred embodiment of the invention the reverse breakdown voltages must be at least 400 volts in order to handle the reverse bias voltages of approximately 400 volts when the combiner is attached to twisted pair lines connecting repeater nodes in a pair gain system.

The low pass filter 44 comprises a first inductor 66 connected to the positive voltage line 42a and a second inductor 68 connected to the negative voltage line 42b. The outputs of the first inductor 66 and the second inductor 68 are connected to lines 46a and 46b, respectively. Inductors 66 and 68 are preferably at least 1500 micro H. However, other inductors, having other inductance values can be used without departing from the present invention. However, in accordance with preferred embodiments, the inductance should be sufficiently large to prevent the combiner 14 from drawing power from the high-frequency signals transmitted between repeater nodes when the combiner 14 is attached to a telecommunications modem system.

Line 46a, the positive voltage output of the low pass filter 44, is connected to a source input of p-channel mos transistors 70 and 72 (labeled P1 and P2 respectively). The gate of p-channel transistor 70 is connected to a resistor 74. The resistor 74 is connected to the cathode of a zener diode 76. A resistor 73 and 15 volt zener diode 75 are connected between the gate and source (line 46a) of the p-channel mos transistor 70. The zener diode 75 is oriented to break down when the source to gate voltage of the p-channel mos transistor 70 exceeds 15 volts. Line 78 connects the anode of the zener diode 76 to terminal 24a of the power combiner 14. Terminal 24a is connected to line 22a when the combiner 14 is attached to a twisted pair transmission wire of a telecommunications repeater system. The drain of p-channel transistor 70 is connected to line 80. Line 80, in turn is connected to terminal 24b of the power combiner 14. Terminal 24b is connected to line 22b when the combiner 14 is attached to a transmission wire of a telecommunications repeater system.

The gate of p-channel transistor 72 is connected to a resistor 82. The resistor 82 is connected to the cathode of a zener diode 84. A resistor 81 and 15 volt zener diode 83 are connected between the gate and source (line 46a) of the p-channel mos transistor 72. The zener diode 83 is oriented to break down when the source to gate voltage of the p-channel mos transistor 72 exceeds 15 volts. Line 80 connects the anode of the zener diode 84 to terminal 24b of the power combiner 14. The drain of p-channel transistor 72. is connected to line 78. Line 78 is connected to terminal 24a of the power combiner 14.

Line 46b, the negative voltage output of the low pass filter 44, is connected to a source input of n-channel mos transistors 86 and 88 (labeled N1 and N2 respectively). The gate of n-channel transistor 86 is connected to a resistor 90. The resistor 90 is connected to the anode of a zener diode 92. A resistor 89 and 15 volt zener diode 91 are connected between the gate and source (line 46b) of the n-channel mos transistor 86. The zener diode 91 is oriented to break down when the gate to source voltage of the n-channel mos transistor 86 exceeds 15 volts. Line 80 connects the cathode of the zener diode 92 to terminal 24b of the power combiner 14. The drain of n-channel transistor 86 is connected to line 78.

The gate of n-channel transistor 88 is connected to a resistor 94. The resistor is connected to the anode of a zener diode 96. A resistor 93 and 15 volt zener diode 95 are connected between the gate and source (line 46b) of the n-channel mos transistor 88. The zener diode 95 is oriented to break down when the gate to source voltage of the n-channel mos transistor 88 exceeds 15 volts. Line 78 connects the cathode of the zener diode 96 to terminal 24a of the power combiner 14. The drain of n-channel transistor 88 is connected to line 80. Line 90 is connected to terminal 24b of the power combiner 14.

In the presently preferred embodiment of the present invention, the zener diodes 76, 84, 92 and 96 have reverse breakdown voltages of approximately 100 volts. It is noted that such devices have been provided to prevent differences between the d.c. voltage of the signaling pair 22 and the express pair 18 from turning on the all four of the field effect transistors. For example, if the express pair is at a differential voltage of 400 volts d.c., and the signaling pair is at 250 volts d.c., then all of the transistors 70, 72, 86 and 88 would be on if not for the zener diodes 76, 84, 92 and 96 having large reverse bias breakdown voltages. The zener diodes 84 and 96 do not break down when the voltage on line 78 corresponds to the negative voltage line on an attached pair gain twisted wire (which would otherwise enable transistors 72 and 88 to be turned on). On the other hand, zener diodes 92 and 76 break down when the voltage on line 80 corresponds to the positive voltage line on the attached pair gain twisted wire. This allows transistors 70 and 86 to be properly turned on.

Zener diodes 75, 83, 91 and 95 all have break down voltages of approximately 15 volts and thus prevent the magnitude of the gate-to-source voltages from exceeding 15 volts in mos transistors 70, 72, 86 and 88. This prevents excessive, potentially damaging voltages (e.g., 20 volts) from building between the gate and source of the mos transistors.

Resistors 73, 74, 81, 82, 89, 90, 93 and 94 are each about 1 million ohms. These resistors perform current limiting and voltage dividing functions in the matching circuit 48. Other suitable resistances will be known to those skilled in the art in view of this specification.

In general, the polarity matching circuit 48 is designed to connect the positive voltage line 46a to a corresponding positive voltage modem repeater line and to connect the negative voltage line 46b to a corresponding negative voltage modem repeater line when the lines 22a and 22b are connected to a modem repeater twisted pair transmission line. The manner in which this occurs is demonstrated below in conjunction with FIG. 5. While a specific circuit has been illustratively depicted and described in FIG. 3, it is noted that the circuits may be constructed from alternative electronic and mechanical circuits including bi-polar junction transistors and magnetic core switching circuits to name just two.

Turning briefly to FIG. 4, a table summarizes the operation of the diode bridge 40 to render a positive voltage on line 42a and a negative voltage on 42b regardless of how the power combiner is attached to a high voltage power source via lines 18a and 18b. It assumes that the magnitude of the voltages on lines 18a and 18b always equal or exceed the voltages on lines 22a and 22b. For example, if the voltages on lines 18a and 18b are +200 and−200, respectively, then the magnitude of voltages on lines 22a and 22b are between +200 and−200 volts.

In the first case represented in FIG. 4, terminal 20a is attached to a positive voltage and 20b is attached to a negative voltage. In this instance diode 52 is forward biased and current flows from line 50 to line 42a. Diode 54 is reverse biased and thus no current flows through it. Diode 60 is forward biased and a current flows from line 42b to line 56. Diode 58 is reverse biased and thus no current flows through it. The result is a steady state voltage of line 42a that is less than a volt below the positive voltage of line 50, and the voltage of line 42b is slightly greater (less than a volt) than the negative voltage of line 56.

In the second case represented in FIG. 4, terminal 20a is attached to the negative voltage input from the remote power supply 10. In this instance diode 54 is forward biased and current flows from line 42b to line 50. Diode 52 is reverse biased and thus no current flows through it. Diode 58 is forward biased and a current flows from line 56 to line 42a. Diode 60 is reversed biased. The result is a steady state voltage of line 42a that is again less than a volt below the positive voltage of line 56, and the voltage of line 42b is again slightly greater than the negative voltage input of line 50. Thus, as shown by the two possible cases, the voltage of line 42a is always the positive voltage and the voltage of line 42b is always the negative voltage without regard to the voltages of power lines 18a and 18b that are connected to terminals 20a and 20b.

Turning to FIG. 5, a summary is provided of the operation of the polarity matching circuit 48. Similar to. the table shown in FIG. 4, two connection schemes are possible:(1) terminal 24a is connected to the positive voltage line of a twisted pair transmission line, or (2) terminal 24a is connected to the negative voltage line of a twisted pair transmission line. In the first case, as summarized in the first row, transistor P1 is off and transistor P2 is on. As a result, current flows from positive voltage line 46a to positive voltage terminal 24a through P2. Transistor N1 is off and transistor N2 is on. Therefore current flows from the negative voltage line connected to terminal 24b to the negative voltage line 46b.

In the second case (terminal 24b is connected to the positive voltage twisted pair modem wire), as summarized in the second row, transistor P1 is on and transistor P2 is off. Current therefore flows from positive voltage line 46a to positive voltage terminal 24b through P1. Transistor N1 is on and transistor N2 is off. Therefore current flows from the negative voltage line connected to terminal 24a to the negative voltage line 46b. Readily ascertainable from the above summary is that regardless of whether terminal 24a is connected to the positive voltage modem transmission line or the negative voltage modem transmission line via line 22a, polarity matching circuits will automatically configure the connections to the positive and negative voltage lines 46a and 46b.

The tables in FIGS. 4 and 5 demonstrate one of the advantages of the preferred embodiment of the present invention. That advantage is virtually foolproof connection of the power combiner 14 into a modem repeater system at virtually any point on a transmission link including anywhere on a twisted pair transmission line between two modem repeaters or at the receive/transmit terminals of the modem repeaters.

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A power combiner circuit for providing power to telecommunications modem transmission nodes via electrical connection to twisted pair lines carrying digital data transmissions between a first and second node in the telecommunications modem system, the power combiner circuit comprising:

a set of power source terminals for receiving power from a remote supplemental power source;

a low pass filter including first leads coupled to the set of power source inputs;

a line polarity matching circuit coupled to second leads of the low pass filter, the line polarity matching circuit including:
a first matching circuit lead;
a second matching circuit lead; and
configuration circuitry interposed between the second leads of the low pass filter and the first and second matching circuit leads, the configuration circuitry comprising switching circuits having control inputs corresponding to the first matching circuit lead and second matching circuit lead.

2. The power combiner of claim 1 further comprising a diode bridge interposed between the set of high voltage power source terminals and the low pass filter, the diode bridge comprising diodes oriented to ensure that a positive voltage lead and a negative voltage lead are internally routed from the set of high voltage power source terminals to corresponding positive and negative voltage leads to the low pass filter when the power combiner is attached to a supplemental power source.

3. The power combiner of claim 1 wherein the low pass filter comprises a first inductor corresponding to a positive voltage transmission line and a second inductor corresponding to a negative voltage transmission line.

4. The power combiner of claim 1 wherein the line polarity matching circuit comprises:

a first p-channel transistor interposed between a positive voltage lead from the low pass filter and the first matching circuit lead; and a second p-channel transistor interposed between the positive voltage lead from the low pass filter and the second matching circuit lead.

5. The power combiner of claim 4 wherein a gate input of the first p-channel transistor corresponds to the second matching circuit output lead and a gate input of the second p-channel transistor corresponds to the first matching circuit output lead.

6. The power combiner of claim 1 wherein the line polarity matching circuit comprises:

a first n-channel transistor interposed between a negative voltage lead from the low pass filter and the second matching circuit lead; and a second n-channel transistor interposed between the negative voltage lead from the low pass filter and the first matching circuit lead.

7. The power combiner of claim 6 wherein the low pass filter is connected to a diode bridge wherein the diode bridge is interposed between the set of power source terminals and the low pass filter.

8. The power combiner of claim 4 wherein a gate input of the first n-channel transistor corresponds to the first matching circuit lead and a gate input of the second n-channel transistor corresponds to the second matching circuit lead.

9. The power combiner of claim 1 wherein the supplemental power source is a phone company remote power source.

* * * * *